US008427970B2

(12) United States Patent
Benkis

(10) Patent No.: US 8,427,970 B2
(45) Date of Patent: Apr. 23, 2013

(54) APPARATUS AND METHOD FOR DETERMINING A SERVICE INTERRUPTION TIME MEASUREMENT

(76) Inventor: Laris Benkis, Ottawa (CA)

( * ) Notice: Subject to any disclaimer, the term of this patent is extended or adjusted under 35 U.S.C. 154(b) by 393 days.

(21) Appl. No.: 12/617,563

(22) Filed: Nov. 12, 2009

(65) Prior Publication Data
US 2010/0124180 A1 May 20, 2010

Related U.S. Application Data

(60) Provisional application No. 61/114,638, filed on Nov. 14, 2008.

(51) Int. Cl.
*H04L 1/00* (2006.01)
(52) U.S. Cl.
USPC .......................................................... 370/252
(58) Field of Classification Search .......... 370/229–238, 370/351, 241–241.1, 247–253, 310; 709/238–242
See application file for complete search history.

(56) References Cited

U.S. PATENT DOCUMENTS

| | | | | |
|---|---|---|---|---|
| 6,298,381 B1 * | 10/2001 | Shah et al. | ..................... | 709/228 |
| 7,457,868 B1 * | 11/2008 | Guo | ............................ | 709/224 |
| 2002/0071391 A1 * | 6/2002 | Ishioka | ......................... | 370/238 |
| 2005/0058083 A1 * | 3/2005 | Rogers | ........................... | 370/252 |
| 2005/0099949 A1 * | 5/2005 | Mohan et al. | ............... | 370/236.2 |
| 2005/0099952 A1 * | 5/2005 | Mohan et al. | ................... | 370/241 |
| 2005/0281392 A1 * | 12/2005 | Weeks et al. | .................... | 379/22 |
| 2006/0239199 A1 * | 10/2006 | Blair et al. | .................... | 370/248 |
| 2007/0008953 A1 | 1/2007 | Wing et al. | | |
| 2008/0298265 A1 | 12/2008 | Filsfils et al. | | |

* cited by examiner

*Primary Examiner* — Jeffrey M Rutkowski
*Assistant Examiner* — Juvena Loo
(74) *Attorney, Agent, or Firm* — Merchant & Gould P.C.

(57) ABSTRACT

A method and apparatus are provided for determining a service interruption time measurement including routing protocol convergence time and Forwarding Information Base (FIB) insertion time, between network devices A and B in a network which has a routing protocol. A plurality of probe packets are then sent from the device A to the device B, each probe packet comprising a source address corresponding to the device A. A network route to the device A for the source IP address used by the probe packets is unknown to the network. A sequence number and sending time is typically assigned to each probe packet being sent. At a predetermined time, a route to the source address of the device A is injected into the routing protocol. Upon return to the device A of a first of the probe packets, an arrival time to is detected and an upper bound and a lower bound of the service interruption time measurement is calculated.

9 Claims, 10 Drawing Sheets

APPARATUS AND METHOD FOR DETERMINING A SERVICE INTERRUPTION TIME MEASUREMENT

This application claims benefit of Ser. No. 61/114,638, filed 14 Nov. 2008 in the United States and which application is incorporated herein by reference. To the extent appropriate, a claim of priority is made to each of the above disclosed applications.

FIELD OF THE INVENTION

The invention pertains to the field of data network and routing protocol or label distribution protocol performance monitoring. The invention more particularly concerns a method and a network element for measuring network protocol convergence.

BACKGROUND OF THE INVENTION

Network operators running dynamic routing or label distribution protocols need to monitor service interruptions caused by routing protocol changes over their network. To monitor the "reaction" of their network following such service interruptions, network operators need to measure the length of the interruption when a change occurs.

For the purposes of this discussion a service interruption time is divided into the following components:
1. A protocol convergence time, which is the time taken for all instances of a routing protocol running on routers in a network to update their Routing Information Bases (RIBs) and propagate any routing changes to other peer routers;
2. In a Multi Protocol Label Switching (MPLS) network, there is an additional protocol convergence component attributable to the time taken to update all Label Switch Router (LSR) label distribution protocol binding tables and propagate any label changes to other peer LSRs;
3. Forwarding Information Base (FIB) Insertion time, which is the time it takes for each router to install the new routing protocol information into its forwarding tables to allow it to send packets to a destination; and
4. In an MPLS network, there is an additional component to the service interruption attributable to Label Forwarding Information Base (LFIB) update time—the time it takes a Label Switch Router (LSR) to update its Forwarding Equivalence Class (FEC) forwarding table.

Already known in the art are commercial active monitoring products measuring routing protocol convergence time only. The method used for measuring routing protocol convergence consists of injecting a route into a network at a specific time from one location in the network and to record the time it is received at other location(s) in the network. This method gives a partial measure of protocol convergence time since it does not measure FIB or LFIB Update. This technique also requires multiple devices to actively or passively participate with the routing protocol.

FIB/LFIB update time is a relatively speedy process which is typically measured in range of milliseconds to 100 s of milliseconds. Protocol convergence time can vary widely depending on the specific protocol and the characteristics of the network on which the protocol is being used. For networks where the protocol convergence time is greater than one or two seconds, the FIB insertion time is inconsequential; however, on modern networks engineered for fast convergence, the protocol convergence can be equal to or less than the FIB insertion time. On these networks knowing the combined protocol+FIB insertion convergence time is important in assessing network performance.

US Patent Application US 2007/0008953 describes a technique to passively measure the effects of randomly occurring routing protocol events on network traffic exchanged between two or more devices in the network. If traffic exchanged between devices is delayed, lost, or corrupted, these impairments are correlated with routing protocol events being passively monitored. This technique allows the impact of actual network routing events to be measured. However, this technique does not enable the periodic monitoring of network and protocol routing convergence to be measured and a baseline of performance to be established against which measurements can be compared.

The Internet Engineering Task Force (IETF) has published a series of Request for Comments (RFCs) and Internet Drafts which discuss the terminology and methods to benchmark various aspects of network convergence. While the terminology these documents introduce is relevant and used herein, the focus of these documents is laboratory testing of a device or a network configuration of multiple devices; the techniques do not lend themselves directly to automated non-disruptive testing required for monitoring production networks.

It is believed that there is a need for a method embodied in a network element that can measure, in an automated and non-disruptive way, the length of service interruption when there is a protocol change in a network, such as a routing protocol change or a label distribution protocol change. There is also a need for a method and network element that can measure service interruptions more accurately than currently utilized techniques, by including in the measure of the service interruption the FIB/LFIB Update time. It would also be desirable to have a method and network element for monitoring service interruptions that can be implemented on a single network element for reducing costs comparatively to techniques requiring at least two and often more devices to participate in the protocol.

SUMMARY OF THE INVENTION

According to a first aspect of the present invention, there is provided an apparatus for determining a service interruption time measurement including routing protocol convergence time and Forwarding Information Base insertion time, between network devices A and B in a network having a routing protocol, said apparatus comprising:
  means for sending a plurality of probe packets from the device A to the device B, each probe packet comprising a source address corresponding to the device A;
  a clock;
  means for injecting, once the means for sending has commenced sending said plurality of probe packets, into the routing protocol, at a predetermined time $t_0$, established by said clock, a route $R_A$ to the source address of the probe packets originating from the device A;
  means for detecting, at the device A, by means of said clock, an arrival time ta, when a first of said probe packets has returned to the device A from the device B; and
  means for determining an upper bound of said service interruption time measurement, based on a time difference between the predetermined time $t_0$ and the arrival time ta.
Preferably, the apparatus further comprises:
  a memory;

means for respectively associating to the probe packets sent by the means for sending, consecutive sequence numbers, and, by means of said clock, sending times ts;

means for storing, for each of the probe packets, the corresponding sequence number and sending time, in the memory;

means for identifying a sequence number n associated to the first of said probe packets that has returned;

means for retrieving from the memory, a sending time $ts_{n-1}$ associated to a probe packet preceding said first of the probe packets; and means for determining a lower bound of said service interruption time measurement, based on a time difference between the predetermined time $t_0$ and the sending time $ts_{n-1}$, said lower bound being set to zero when the time difference between $t_o$ and $ts_{n-1}$ is negative.

According to another aspect of the present invention, there is provided a method for determining a service interruption time measurement including routing protocol convergence time and Forwarding Information Base insertion time, between network devices A and B in a network having a routing protocol, said method comprising steps of:

a. sending a plurality of probe packets from the device A to the device B, each probe packet comprising a source address corresponding to the device A;

b. injecting, once the sending of step a has commenced, into the routing protocol, at a predetermined time $t_0$, established by a clock, a route $R_A$ to the source address of the probe packets originating from the device A;

c. detecting at the device A, by means of said clock, an arrival time ta, when a first of said probe packets has returned to the device A from the device B; and d. determining an upper bound of said service interruption time measurement, based on a time difference between the predetermined time $t_0$ and the arrival time ta.

Preferably, the method further comprises, at step a, respectively associating to the probe packets, consecutive sequence numbers, and, by means of said clock, a sending time ts and storing, for each of the probe packets, the corresponding sequence number and sending time ts, in a memory, the method further comprising after step c, steps of:

e. identifying a sequence number associated to the first of said probe packets that has returned at step c;

f. retrieving from the memory, a sending time $ts_{n-1}$ associated to a probe packet preceding said first of the probe packets; and g. determining a lower bound of said service interruption time measurement, based on a time difference between the predetermined time $t_0$ and the sending time $ts_{n-1}$, said lower bound being set to zero when the time difference between $t_0$ and $ts_{n-1}$ is negative.

Preferably, the method is performed by a device for measuring the convergence of a protocol of a network, wherein a route to the device A for the source IP address used by the probe packets is unknown to the network prior to the execution of the method. The network interface subnet of the device is known to the network and therefore reachable. Probe packets will use an address which exists virtually inside the device. The method preferably comprises the following steps:

a) sending probe packets to an other device, the probe packets comprising a source address field set to an address which is not in use elsewhere on the network;

b) at a predetermined time $t_0$, announcing over the network the route to the source address of the probe packets;

c) detecting at time ta an arrival of a first probe packet from the probe packets sent in step a), said first probe packet being returned by the other device;

d) determining an upper bound of the convergence of the network convergence by routers in the network by subtracting $t_0$ from ta.

Preferably, each of the probe packets comprises a sequential identifier or sequence number and an indicator of the time ts, that is, the "sending time", at which the probe packet is sent. The sending time ts does not have to be in the packet, it can be stored on device A, for example, along with the sequence number. Following the step of determining an upper bound for the convergence of the protocol, the method further comprises a step of determining a lower bound of the convergence of the protocol by subtracting a time indicator $ts_{n-1}$ of a probe packet sent just before the first received packet from the predetermined time $t_0$, the device having previously stored the sending time $ts_{n-1}$ of the probe packet.

Also preferably, the network protocol may be Internet Protocol version 4 (IPv4) or Internet Protocol version 6 (IPv6).

Accordingly, the device preferably comprises:

a) means for sending probe packets to an other device, the probe packets comprising a source address which is not in use elsewhere on the network;

b) means for announcing over the network, at a predetermined time $t_0$, the route to the source address of the probe packets;

c) means for detecting at time $t_1$ a first probe packet from the probe packets sent by the means for sending, said first probe packet being returned by the other device;

d) means for determining an upper bound of the convergence of the protocol by subtracting $t_0$ from $t_1$.

Still preferably, each of the probe packets comprises a sequential identifier i.e. the sequence number, and an indicator of the time ts, that is, the "sending time", at which the probe packet is sent. Still preferably, the device may further comprise means for determining a lower bound of the convergence of the protocol by subtracting a time indicator $ts_{n-1}$ of a probe packet sent just before the first packet from the predetermined time $t_0$.

BRIEF DESCRIPTION OF THE DRAWINGS

The present invention and its advantages will be better understood and apparent upon reading the following detailed description made with reference to the accompanying drawings wherein.

Figure 1:
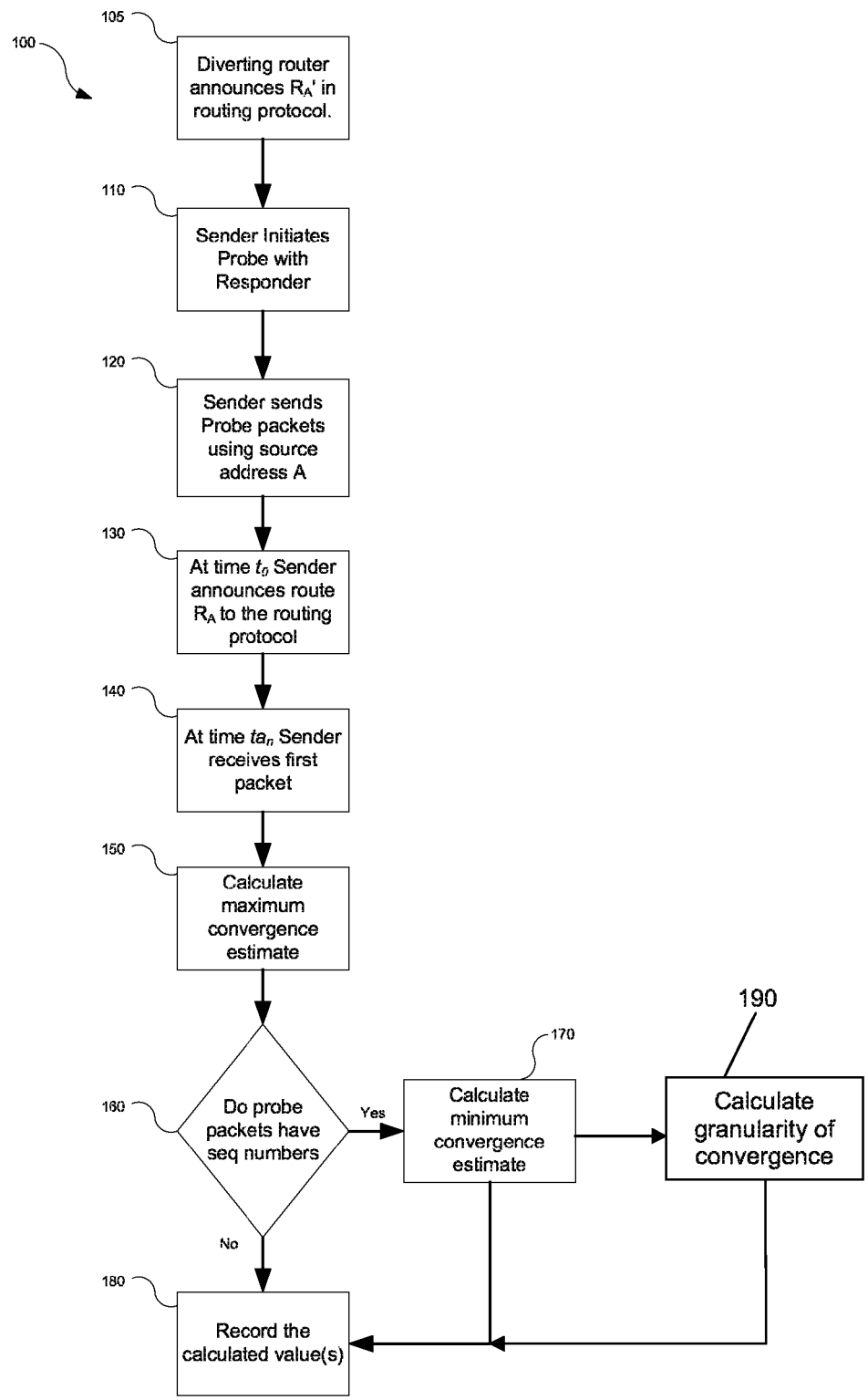
FIG. 1 is a flow chart showing the steps performed for determining a service interruption time measurement, according to a first preferred embodiment of the invention.

While the invention will be described in conjunction with exemplified embodiments, it will be understood that these embodiments are not intended to limit the scope of the invention to such embodiment. On the contrary, the present invention is intended to cover all alternatives, modifications and equivalents as may be included as defined by the appended claims.

DESCRIPTION OF A PREFERRED EMBODIMENT

In the following description, similar features in the drawings have been given similar reference numerals. To preserve the clarity of the drawings, some reference numerals may have been omitted if they were already identified in a preceding figure.

It is worth mentioning that throughout the present description, the expression protocol is intended to mean (depending on the context) any dynamic IP routing protocol, or label distribution protocols, such as LDP (Label Distribution Protocol), or Resource Reservation Protocol-Traffic Engineering (RSVP-TE).

In addition, this description uses the terms Convergence Event and Convergence Recovery Instant defined in the IETF (Internet Engineering Task Force) Internet Draft *Terminology for Benchmarking Link-State Interior Gateway Protocol (IGP) Data Plane Route Convergence*. These definitions were intended to apply the Link-State routing protocols. However, this document extends the application of these terms to include the convergence of routing protocols in general and convergence of Multi Protocol Label Switching (MPLS) label distribution protocols.

This description uses the term Protocol Convergence to mean all the operations a router will perform when a convergence event occurs with the exception of FIB update for routing protocol and Label Forwarding Information Base (LFIB) update for label distribution protocols. These operations can be broadly characterized as: convergence event detection, route processing, and route advertisement to peer routers.

Moreover, in the context of the present description, expressions such as "network protocol convergence", "network convergence", "convergence time", "convergence estimate", "convergence" and "service interruption time measurement" may be used interchangeably, as can be easily understood.

In the context of the present invention, a service interruption time consists the following components:

1. Protocol convergence time—the time taken for all instances of a routing protocol(s) running on routers in the network to update their Routing Information Bases (RIBs) and propagate any routing changes to other peer routers.
2. In an MPLS network, there is an additional protocol convergence component attributable to the time taken to update all Label Switch Router (LSR) label distribution protocol binding tables and propagate any label changes to other peer LSRs.
3. Forwarding Information Base (FIB) Update time—the time it takes for each router to install the new routing protocol information into its forwarding tables to allow it to send packets to a destination.
4. In an MPLS network, there is an additional component to the service interruption attributable to Label Forwarding Information Base (LFIB) update time—the time it takes a Label Switch Router (LSR) to update its Forwarding Equivalence Class (FEC) forwarding table.

Monitoring network protocol convergence can be broadly categorized as passive or active with respect to the routing protocol.

Passive monitoring systems may inject traffic into the network but do not participate actively in the routing protocol—that is, the monitoring system does not advertise or withdraw routes into or from the routing protocol, but rather will listen to routing protocol announcements and withdrawals received from the network.

Active monitoring systems may or may not inject traffic into the network but they will participate in the routing protocol by announcing and withdrawing routes and then measuring in some way the response of the network to these route changes.

In the present description, network topologies are exemplified to illustrate the application of the invention. Skilled network practitioners will recognize that the general techniques described can be applied to a myriad of topologies and network configurations and that the functions performed by each component could, in many cases, be separated or combined into different network elements.

One of the benefits of the present invention, with respect to other existing products and/or methods known in the prior art is that only a single apparatus is required. It is to be understood that one or more network devices of the network, for example, the network device B, has a responder process that runs thereon to receive and return probe packets sent by the device A. The probe packets generated by the device A are compatible with the responder process on the device B.

Referring to FIG. 1, a method 100 for measuring network convergence, according to a first preferred embodiment of the invention, is described. The technique requires three network elements, illustrated in FIG. 3, when referring to system 300a, namely a first network element or device A, hereinafter also referred to as a Sender 310, a second network element or device B, hereinafter also referred to as a Responder 320, and a Diverter Router 360.

A network element, may be a computer, a router, a server or any other device that is provided with a processor, a memory and a network device for allowing the first network element 310 to communicate, i.e. send and receive packets with other elements of the network. The network may be a wired or a wireless network.

The network elements 310, 320 and 360 are deployed on an IP network 330 which may run one or more dynamic routing protocols. The Sender 310 participates in the routing protocol 340 being used on the network and can inject routes into and withdraw routes from the network. The Responder 320 may or may not participate in the routing protocol. If it does not participate in the routing protocol it may use static routes (typically a default route) to send traffic into the network.

The Sender 310 has a network interface 311 which is addressed with the value "A" where "A" is an IPv4 or IPv6 address. The Responder 320 has a network interface 321 which is addressed with the value "B". The interfaces 311, 321 used by both Sender 310 and Responder 320 may be internal virtual interfaces (often called a loopback interface) or they may be physical interfaces. The network 330 must be able to route to the destination address "B" on the Responder. The network 330 must not be able to route to the destination address "A" on the Sender. The values of "A" and "B" are valid IPv4 or IPv6 host addresses.

Figure 3:
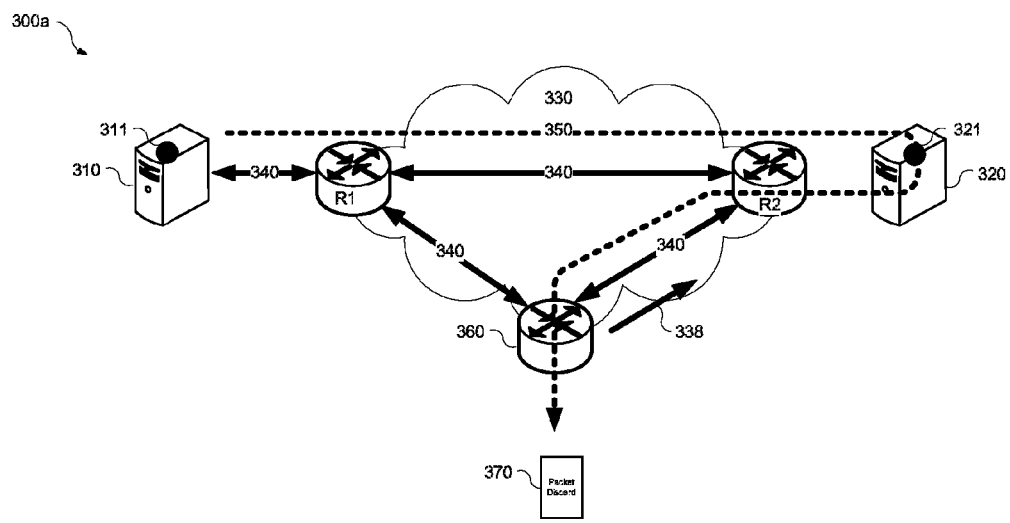
FIG. 3 is a schematic diagram of a first network at one moment of the method according to the first preferred embodiment of the invention.

Referring to FIGS. 1 and 3, as described in step 105, the Diverter Router 360 announces a route $R_A'$ 338. The route $R_A'$ includes the address "A" therefore traffic to "A" is drawn to the Diverter Router 360. The Diverter Router 360 is configured to discard all traffic destined to address "A" into a discard packet 370.

In step 110, the Sender 310 and Responder 320 negotiate the exchange of IP packets. The Sender 310 will send a sequence of IP packets to the Responder 320. The Responder 320 will receive the packets and then try to send them back to the Sender 310. The entire exchange of packets by Sender 310 and Responder 320 is called a "probe" 350 and is illustrated in FIG. 3. The packets sent in the probe 350 may have any suitable format, as long as the probe 350 conforms with the functional characteristics described herein. Moreover, the protocol to negotiate the probe initiation between the Sender 310 and Responder 320 may be any suitable network protocol, as can be understood by a person skilled in the art.

In step 120, the Sender 310 sends the probe packets 350 with an IP source address set to "A" and the destination address "B". The Responder 320 will receive the packets sent by the Sender 310 and shall attempt to return them. The destination IP address of the packets will be set to "A", the source address will be set to "B", and the packets will be sent back into the network 330.

The Sender 310 must not announce a route for the source address "A" and no routes which would cause traffic addressed to "A" to be sent to the sender can exist in the network. Traffic sent by the Responder 320 to the address "A" will be sent to the Diverter Router 360 which is configured to discard all traffic destined to address "A".

Figure 4:
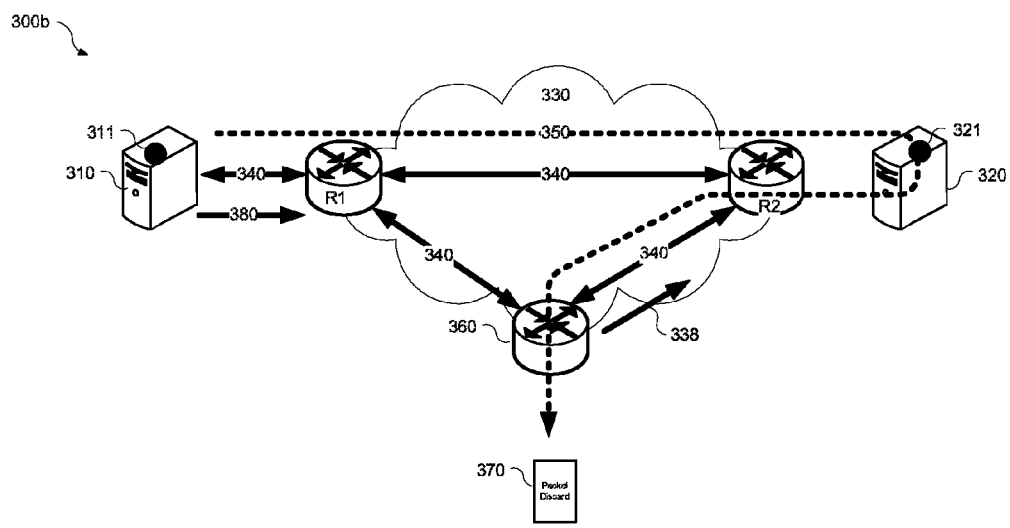
FIG. 4 is a schematic diagram of the first network at a second moment of the method according to the first preferred embodiment of the invention.

Now referring to FIG. 1 and system 300b of FIG. 4, as described in step 130, at some time $t_0$ after the probe has been initiated, the Sender 310 will generate a convergence event by announcing into the network routing protocol a route $R_A$ 380, the range of which includes the address "A". $R_A$ 380 being more specific than $R_A'$ 338, traffic addressed to the destination address "A" will be sent to the Sender 310 rather than the Diverter Router 360. It takes a finite amount of time for the $R_A$ 380 route to propagate to all the routers in the network 330 and for all the routers to install the new route into their FIB tables. While this is happening probe packets sent by the Responder to "A" will not reach the Sender 310.

At some time after $R_A$ has been announced (the convergence recovery instant) the routing protocol(s) in the network 330 will have converged and the route will be installed in the FIB tables of all the routers. At this point packets sent by the Responder 320 to the Sender 310 can reach the Sender 310.

Figure 5:
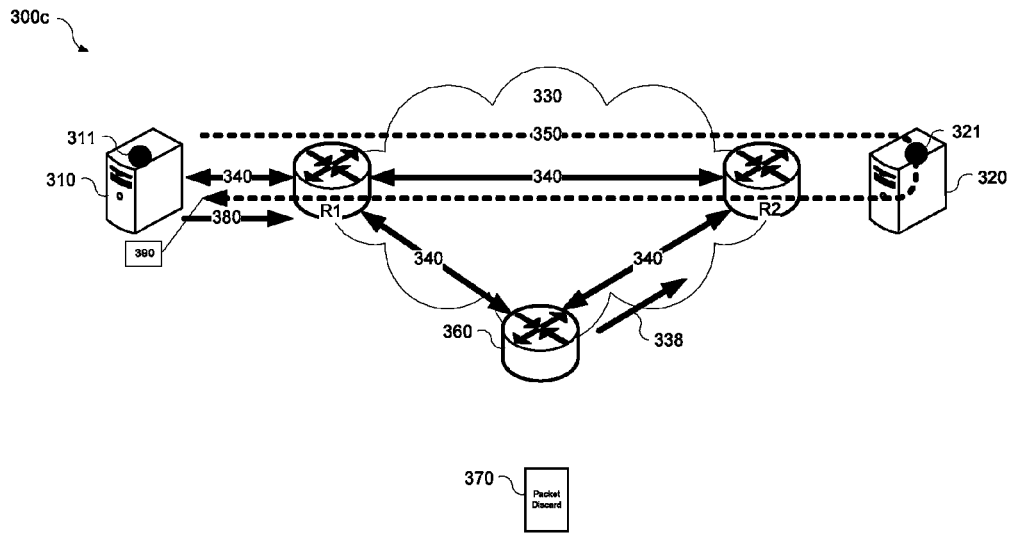
FIG. 5 is a schematic diagram of the first network at a third moment of the method, according to the first preferred embodiment of the invention.

Now referring to FIG. 1 and system 300c of FIG. 5, at some time after the convergence recovery instant the first probe packet 390 is received by the Sender 310, and as described in step 140. If this first packet 390 to return to the Sender is the nth packet generated by the Sender 310 and it arrives at time $ta_n$ the convergence recovery instant is said to occur at or before $ta_n$. In step 150 an upper bound on the network convergence time can be calculated using the following equation:

$$\text{Convergence} < ta_n - t_0$$

Then, this upper bound can be recorded, in a table or a database, and used to establish an upper bound convergence baseline, as shown in step 180.

Thus, when referring to FIG. 1, the method for determining a service interruption time measurement between network devices A 310 and B 320, according a preferred embodiment of the present invention, comprises the steps of:

a. sending 120 a plurality of probe packets from the device A 310 to the device B 320, each probe packet comprising a source address corresponding to the device A 310;

b. injecting 130, once the sending of step a has commenced, into the routing protocol, at a predetermined time $t_0$, established by a clock, a route $R_A$ to the source address of the probe packets originating from the device A;

c. detecting 140 at the device A, by means of said clock, an arrival time ta, also referred to herein as "$ta_n$", when a first of said probe packets has returned to the device A from the device B; and d. determining 150 an upper bound of said service interruption time measurement, based on a time difference between the predetermined time $t_0$ and the arrival time ta.

Preferably, in the step b of injecting 130, the clock has a frequency of at least 1 kHz.

Preferably, the packets sent by the Sender 310 carry a sequence number allowing them to be identified when they are returned to the Sender 310 (this is dependant on the specific probe implementation, and is described by step 160), and the time each packet was originally sent into the network 330 by the Sender 310 is stored on the Sender 310, the following conclusions can be reached:

Conclusion 1: If the first packet 390 to reach the Sender 310 has a sequence number n and was injected into the network 330 by the Sender 310 at time $ts_n$, the network 330 may or may not have converged at time $ts_n$. It is not certain because the network 330 may have converged prior to packet n being sent, or it may have converged while the packet was in-flight.

Conclusion 2: It is certain, however, that if the packet sent prior to seq n, that is seq n−1, was sent at some time $ts_{n-1}$ by the Sender 310, the network 330 had not converged at $ts_{n-1}$. This is clear because the Responder 320 would have sent the packet back some time after $ts_{n-1}$ and the fact that the packet was lost means the network had still not converged at this later time. Therefore, an upper and lower bound (as depicted by step 170) can be calculated for the network convergence time using the following equation:

$$ts_{n-1} - t_0 < \text{Convergence} < ta_n - t_0$$

Figure 13:
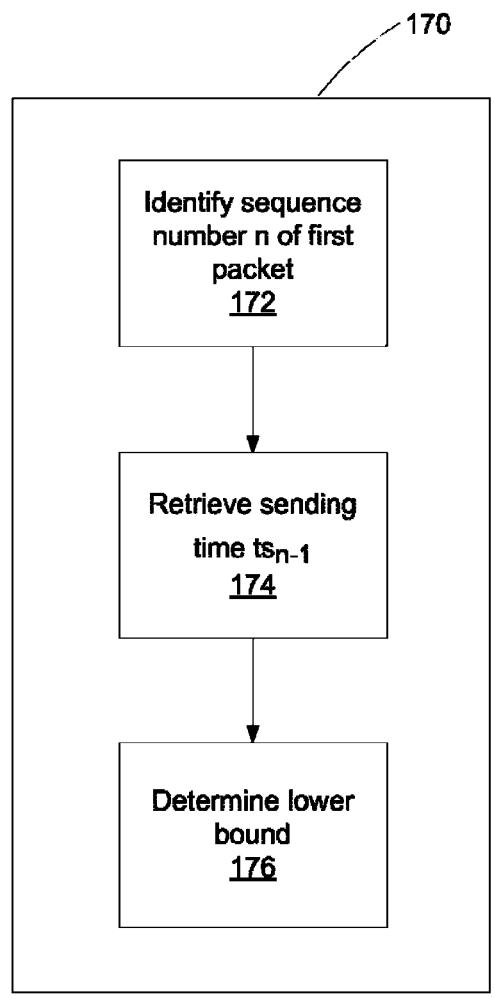
FIG. 13 is a flow chart showing substeps of step 170 shown in FIG. 1.

Thus, with reference now to FIGS. 1 and 13, the step 120 of the method preferably further comprises respectively associating to the probe packets, consecutive sequence numbers, and, by means of the clock, a sending time ts. Preferably, the step 120 includes storing, for each of the probe packets, the corresponding sequence number and sending time ts, in a memory. Preferably the method further comprises after step c, steps of:

e. identifying 172 a sequence number associated to the first of said probe packets that has returned at step c;

f. retrieving 174 from the memory, a sending time $ts_{n-1}$ associated to a probe packet preceding said first of the probe packets; and g. determining 176 a lower bound of said service interruption time measurement, based on a time difference between the predetermined time $t_0$ and the sending time $ts_{n-1}$, said lower bound being set to zero when the time difference between $t_o$ and $ts_{n-1}$ is negative.

Indeed, it is to be understood that if the time difference between $t_0$ and $ts_{n-1}$ is negative, than the lower bound will be determined to equal 0, as represented below:

$$0 < \text{Convergence} < ta_n - t_0$$

The granularity of the convergence estimate is limited by the time interval between each packet sent by the Sender 310, that is, the difference between $ts_n$ and $ts_{n-1}$ plus the network round-trip-time ($rtt_n$) for packet n where $rtt_n$ is the time it took a packet n to travel from the Sender 310 to the Responder 320 and back to the Sender 310. It is calculated (as depicted by step 190) using equation:

$$\text{Measurement Granularity} = (ts_n - ts_{n-1}) + rtt_n.$$

Figure 14:
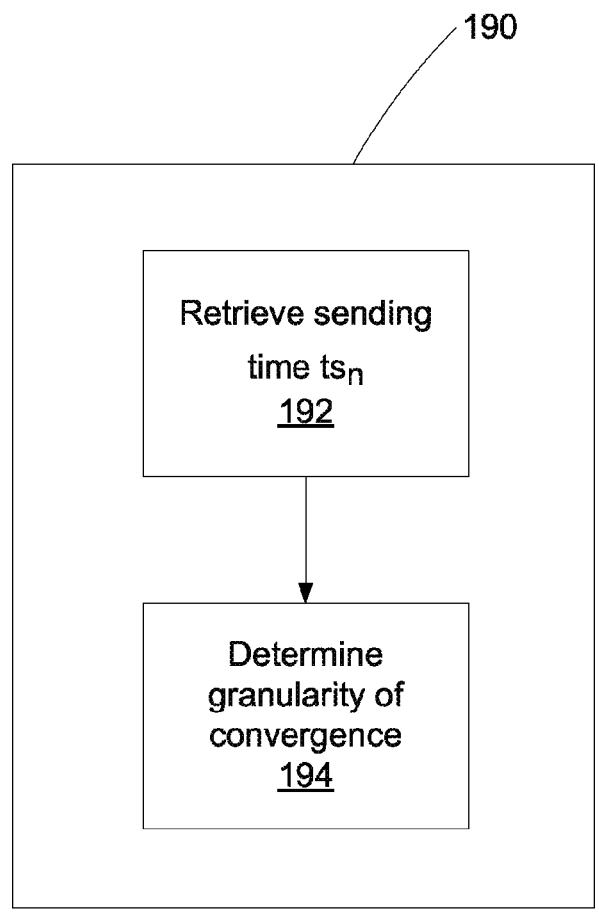
FIG. 14 is a flow chart showing substeps of step 190 shown in FIG. 1.

Thus, with reference now to FIGS. 1 and 14, the method preferably further comprises steps of:
h. retrieving 192 from the memory a sending time $ts_n$ associated to said first of said probe packets; and
i. determining 194 a granularity of the service interruption time measurement, based on a time difference between the sending times $ts_n$ and $ts_{n-1}$ added to a round-trip-time $rtt_n$, said round-trip-time $rtt_n$ corresponding to a travel time of the said first of the probe packets, from the device A to the device B and back to the device A.

The convergence time calculated provides an estimate of the performance of the network elements and the routing protocol in the path taken by probe packets traveling from the Responder 320 to the Sender 310. It does not indicate the performance of network elements which are not in this path.

The method 100 easily scales to many paths in the network 330 by having the Sender 310 simultaneously initiate probes 350 to an arbitrary number of Responders 320.

The Sender 310 and Responders 320 can be standalone devices or can be integrated into other network elements such as routers.

Figure 6:
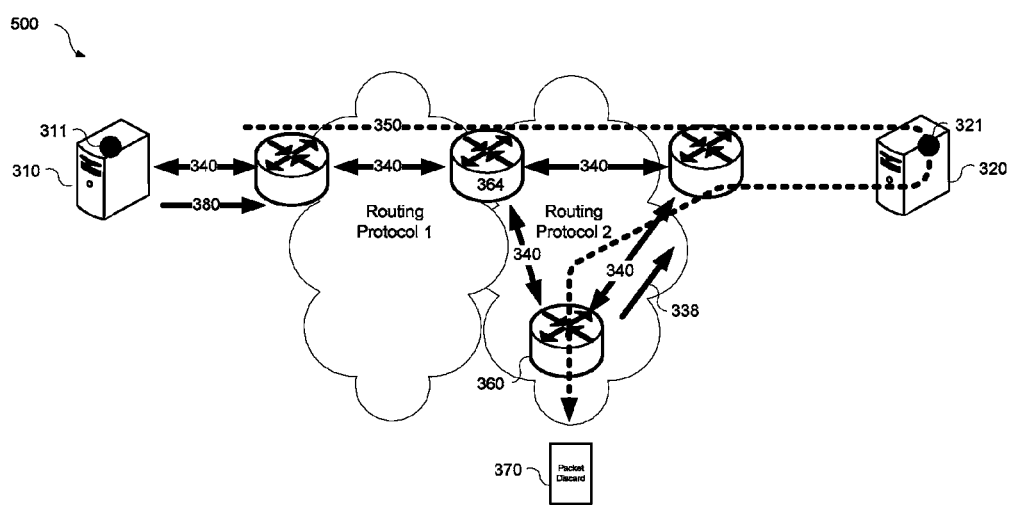
FIG. 6 is a schematic diagram of a second network at a moment of the method according to the first preferred embodiment of the invention.

The method 100 can be applied to networks 330 with more than one routing protocol. In system 500 of FIG. 6, two routing protocols 340 are used. Routes are exchanged between the protocols via a Common Router 364 that runs both protocols 340. In this example the route for "A" would be announced into Routing Protocol 1, illustrated by arrow 380 and then redistributed into Routing Protocol 2 by the common router 364. The method to calculate convergence in this example is illustrated in the flow chart in FIG. 1, which is an embodiment of method 100 for measuring network convergence.

In a second embodiment of the invention, the method can be applied to Multi Protocol Label Switching (MPLS) networks 330 which label switch traffic to measure the convergence time of the network Interior Gateway Protocol (IGP) and label distribution protocol.

Figure 2:
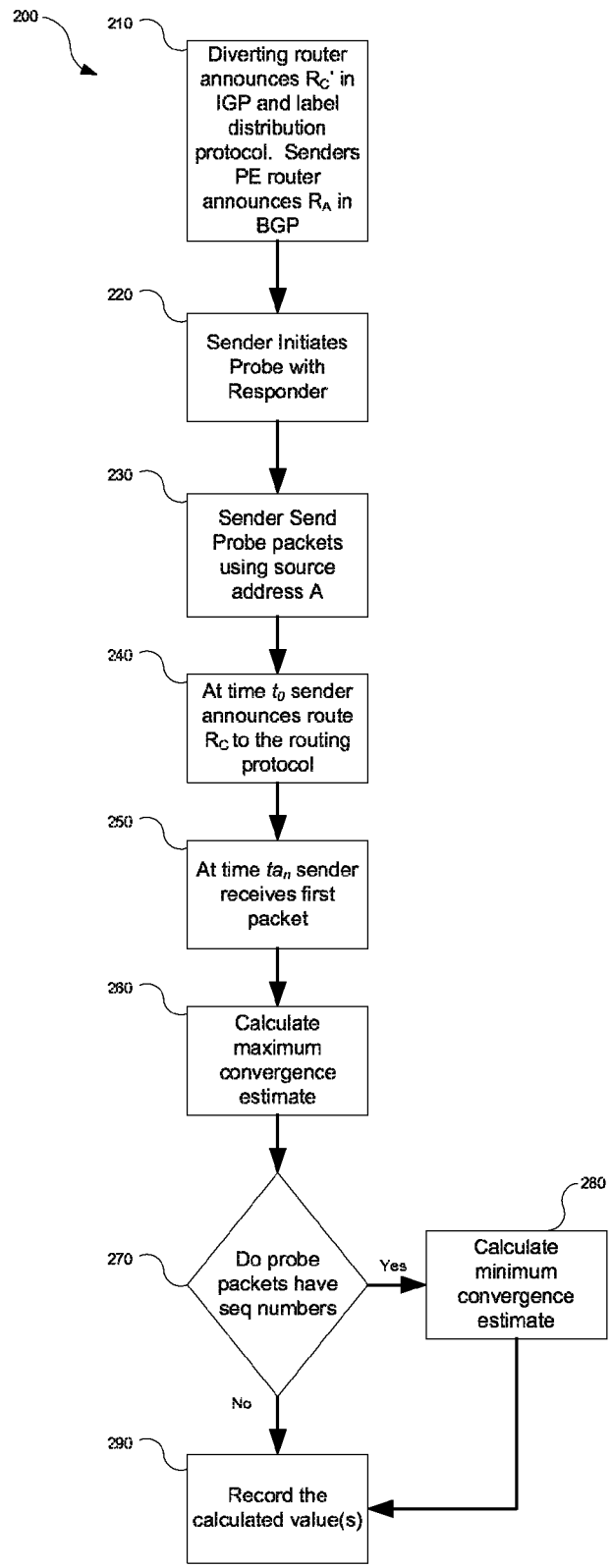
FIG. 2 is a flow chart showing the steps performed for determining a service interruption time measurement according to a second preferred embodiment of the invention.
Figure 7:
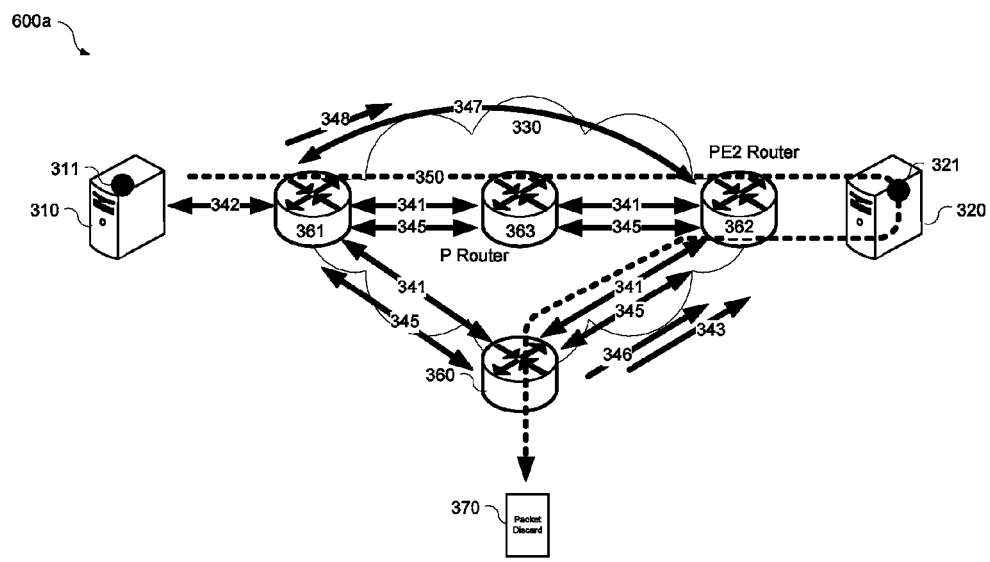
FIG. 7 is a schematic diagram of a third network at a moment of the method according to a second preferred embodiment of the invention.

Referring to FIG. 2, there is shown a flowchart of an embodiment of a method 200 for measuring convergence of IGP and a label distribution protocol in an MPLS network 330 (illustrated in FIG. 7).

Referring to FIG. 2 and system 600a of FIG. 7, the Sender 310 communicates via a routing protocol 342 with a Provider Edge (PE) router 361. The PE router 361 communicates via an IGP 341 and a label distribution protocol 345 with other Provider (P) routers 363 and Provider Edge (PE) routers 362 in the routing domain. The PE router 361 communicates with other PE routers and/or route-reflector(s) using Border Gateway Protocol (BGP) 347. An alternate embodiment would be to incorporate the Sender function in the PE router.

The Sender-to-PE routing protocol 342 may be the IGP 341 used for the MPLS domain or it may be some other routing protocol.

In step 210, the PE router 361 announces into the BGP 347 a route $R_A$ 348 which includes the IP address "A" of the Sender interface 311. The route $R_A$ 348 is specific enough that it is the preferred route to "A" in the network 330. The BGP next hop for the route $R_A$ 348 is set to an address "C". The PE router 361 has a route to the address "A" 311 on the Sender 310.

The Diverting Router 360 participates in the IGP 341 and the label distribution protocol 345. In step 210 the Diverting Router 360 announces a route Re into the IGP 343 and into the label distribution protocol 346. The route Re includes "C" the BGP next-hop address of $R_A$. Traffic routed by PE routers to "A" is label-switched to the Diverting Router. The Diverting Router 360 is configured to drop all traffic with a destination address "A".

As described in FIG. 2, in step 220, the Sender 310 negotiates a probe 350 with the Responder 320 and sends packets using source address "A" and a destination address of "B".

In step 230, probe packets 350 returned by the Responder 320 to the Sender 310 with a destination address "A" are label switched by the PE router 362 closest to the Responder 320 (note that the Responder function could also be incorporated in the PE router) towards the Diverting router 360. The Diverting Router 360 discards the probe packets into the packet discard 370.

Figure 8:
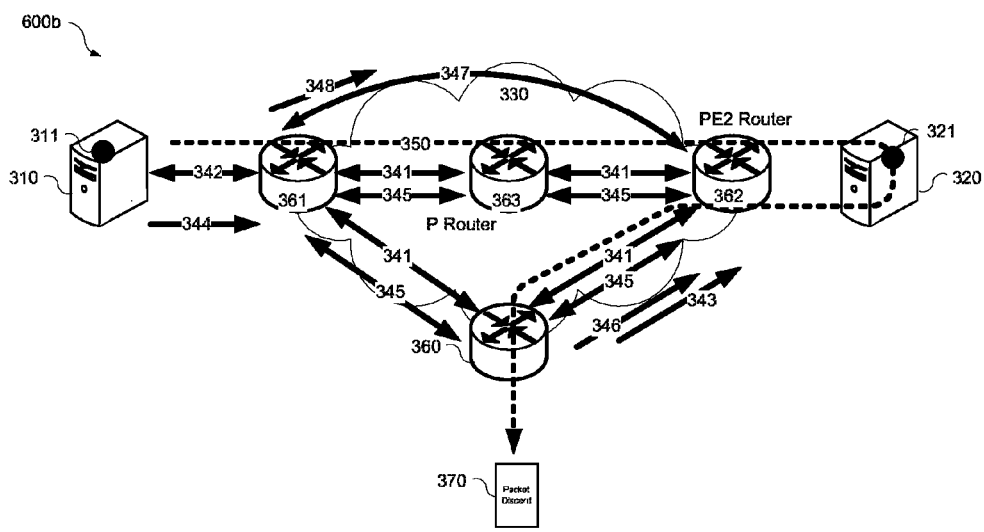
FIG. 8 is a schematic diagram of the third network at another moment of the method according to the second preferred embodiment of the invention.

Referring to FIG. 2 and system 600b of FIG. 8, in step 240, at some time $t_o$ after the probe 350 has been initiated, the Sender 310 will generate a convergence event by announcing a route for $R_C$ 344 to its closest PE router 361. The route $R_C$ includes the BGP next-hop address "C" and is more specific than $R_C'$ announced by the Diverting Router 360.

Figure 9:
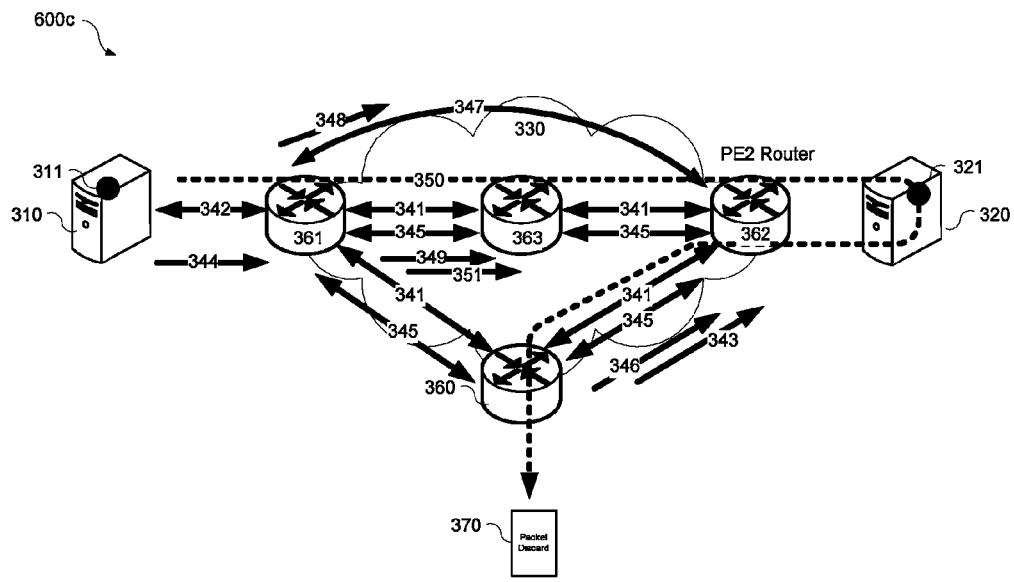
FIG. 9 is a schematic diagram of the third network at yet another moment of the method according to the second preferred embodiment of the invention.

Referring to FIG. 2 and system 600c of FIG. 9, after receiving $R_C$, the PE router 361 will, in turn, announce $R_C$ into the IGP 351 and the label distribution protocol 349.

It takes a finite amount of time for the route to propagate to all the routers in the network and for all the routers to install the new route into their FIBs and Label Forwarding Tables. While this is happening probe packets sent by the Responder to the Sender will not reach the Sender, as illustrated in FIG. 7.

Figure 10:
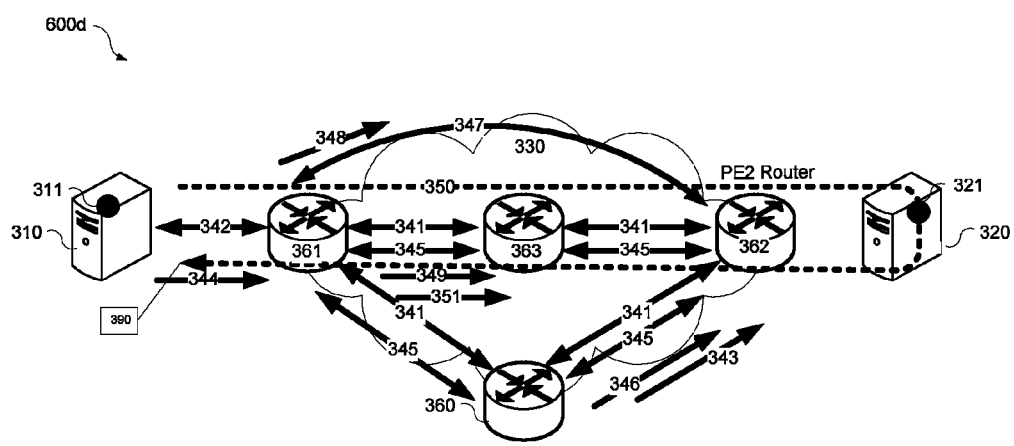
FIG. 10 is a schematic diagram of the third network at yet another moment of the method according to the second preferred embodiment of the invention.

Referring to FIG. 2 and system 600d of FIG. 10, at some later time (the Convergence Recovery Instant) the IGP and label distribution protocol in the network 330 will have converged and the route will be installed in FIBs and the Label Forwarding Tables of all the routers. Since $R_C$ has a longer prefix length than $R_C'$ it is preferred for the label forwarding decision by the PE router closest to the Responder 320. At this point packets 390 sent by the Responder 320 to the Sender 310 will be label switched towards the Sender 310 and will be received by the Sender 310, as in step 250.

Establishing the bounds of the convergence estimate applies with the equations described above for the first preferred embodiment, and is depicted in FIG. 2, at steps 260, 270, 280 and 290.

The methods described herein depend on the capabilities of the probe implementation in the Responder. Particularly, the Sender must be able to send packets to the Responder to negotiate the execution of the probe using a source IP address different from the source address used by the actual probe packets. This is because the source IP address used during the negotiation must be reachable in the network so that negotiation response packets from the Responder are received by the Render while the source IP address of the probe packets must not be reachable in the network.

If the probe protocol implementation on a Responder does not allow a probe packet source IP address to be specified which is different than the negotiation packet source IP address, the following technique can be used to work around the limitation:

Negotiate a probe using a source IP address on the Sender which is reachable in the network. If the response from the Responder indicates that the negotiation was successful, immediately negotiate a second probe using the source IP address to be used by the probe packets; the response packet(s) from the Responder will not reach the Sender, but it can be assumed that the negotiation was successful since the first probe was negotiated successfully. If the probe negotiation protocol allows the duration that the probe will be active to be specified, the first probe negotiation should specify the minimum duration possible since this probe will not actually be used and is just a verification of the negotiation process. If the response to the first negotiation indicates a failure then do not attempt the second negotiation.

Figure 11:
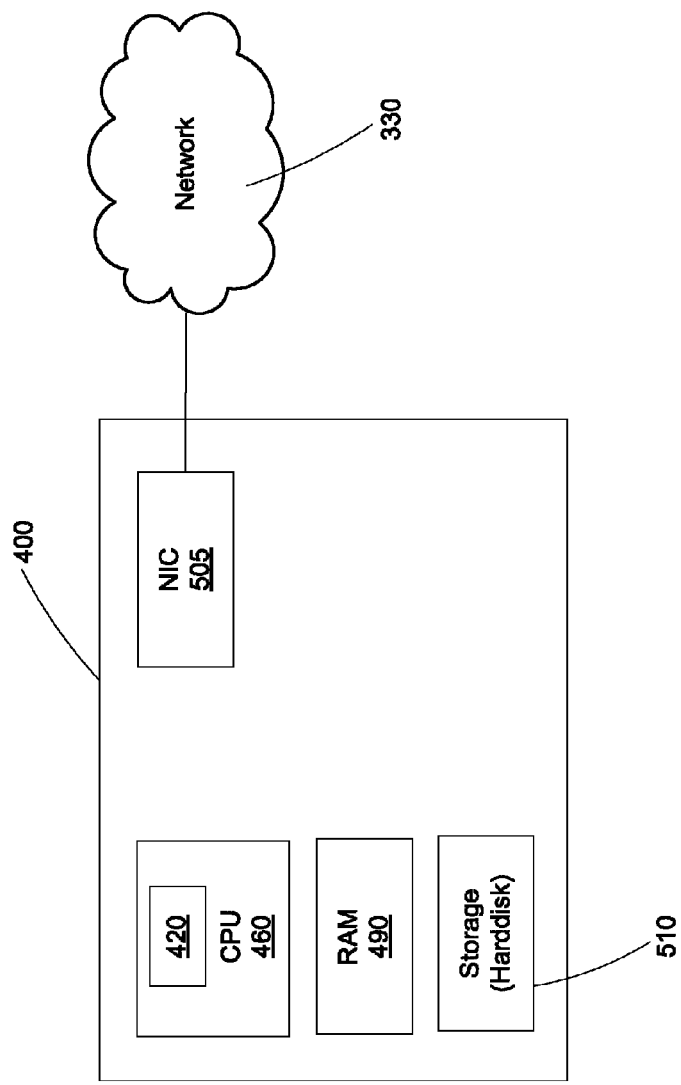
FIG. 11 is a block diagram of an apparatus for determining a service interruption time measurement, according to a preferred embodiment of the present invention.

Preferably, referring now to FIG. 11, the above-described method is carried out via an apparatus 400. Preferably, the apparatus comprises: means for sending a plurality of probe packets from the device A to the device B, each probe packet comprising a source address corresponding to the device A; a clock 420; means for injecting, once the means for sending has commenced sending said plurality of probe packets, into the routing protocol, at a predetermined time $t_0$, established by said clock 420, a route $R_A$ to the source address of the probe packets originating from the device A; means for detecting, at the device A, by means of said clock 420, an arrival time ta, when a first of said probe packets has returned to the device A from the device B; and means for determining an upper bound of said service interruption time measurement, based on a time difference between the predetermined time $t_0$ and the arrival time ta.

Preferably, the apparatus further comprises: a memory; means for respectively associating to the probe packets sent by the means for sending, consecutive sequence numbers, and, by means of said clock 420, sending times ts; means for storing for each of the probe packets, the corresponding sequence number and sending time, in the memory; means for identifying a sequence number n associated to the first of said probe packets that has returned; means for retrieving from the memory, a sending time $ts_{n-1}$ associated to a probe packet preceding said first of the probe packets; and means for determining a lower bound of said service interruption time measurement, based on a time difference between the predetermined time $t_0$ and the sending time $ts_{n-1}$, said lower bound being set to zero when the time difference between $t_0$ and $ts_{n-1}$ is negative.

The memory may be any medium which may hold data, for example, a long-term storage medium, a temporary storage medium, or the like. Moreover, the data may be stored in the form of a file, a table, a database and/or the like.

Still preferably, the apparatus comprises means for retrieving from the memory a sending time $ts_n$ associated to said first of said probe packets; and means for determining a granularity of the service interruption time measurement, based on a time difference between the sending times $ts_n$ and $ts_{n-1}$ added to a round-trip-time $rtt_n$, corresponding to a travel time of said first of the probe packet, from the device A to the device B and back to the device A.

Preferably, still referring to FIG. 11, the apparatus 400 is embodied by a computing device which can be linked to a network 330 to be monitored. Preferably, the apparatus 400 comprises a central processing unit (CPU) operatively connected to the clock 420, the CPU 460 comprising a software program for providing, via an operating system, the means for sending, the means for injecting, the means for detecting and the means for determining the upper bound; a random access memory (RAM) 490 operatively connected to the CPU 460 for executing the software program; and a network interface card 505, operatively connected to the CPU 460 for providing communication with the network 330. Preferably, the clock 420 has a frequency of at least 1 kHz, however the clock 420 may have any suitable frequency, even lower than 1 kHz, which allows achieving the desired precision. Moreover, the clock 420 is preferably comprised in the CPU 460.

Preferably, the CPU 460 also provides the apparatus with the means for respectively associating consecutive sequence numbers and sending times to the probe packets sent by the means for sending. Furthermore, the CPU 460 also provides the means for storing the sequence numbers and sending times, the means for identifying a sequence number n associated to the first probe packet having returned from device B, the means for retrieving from the memory the sending time $ts_{n-1}$, the means for determining a lower bound of the service interruption time measurement, the means for retrieving from the memory the sending time $ts_n$ and the means for determining a granularity of the service interruption time measurement.

The apparatus 400 preferably includes a memory or storage medium such as a hard disk 510, which is operatively connected to the CPU 460. The RAM 490 also provides a storage medium for executing the software program.

Figure 12:
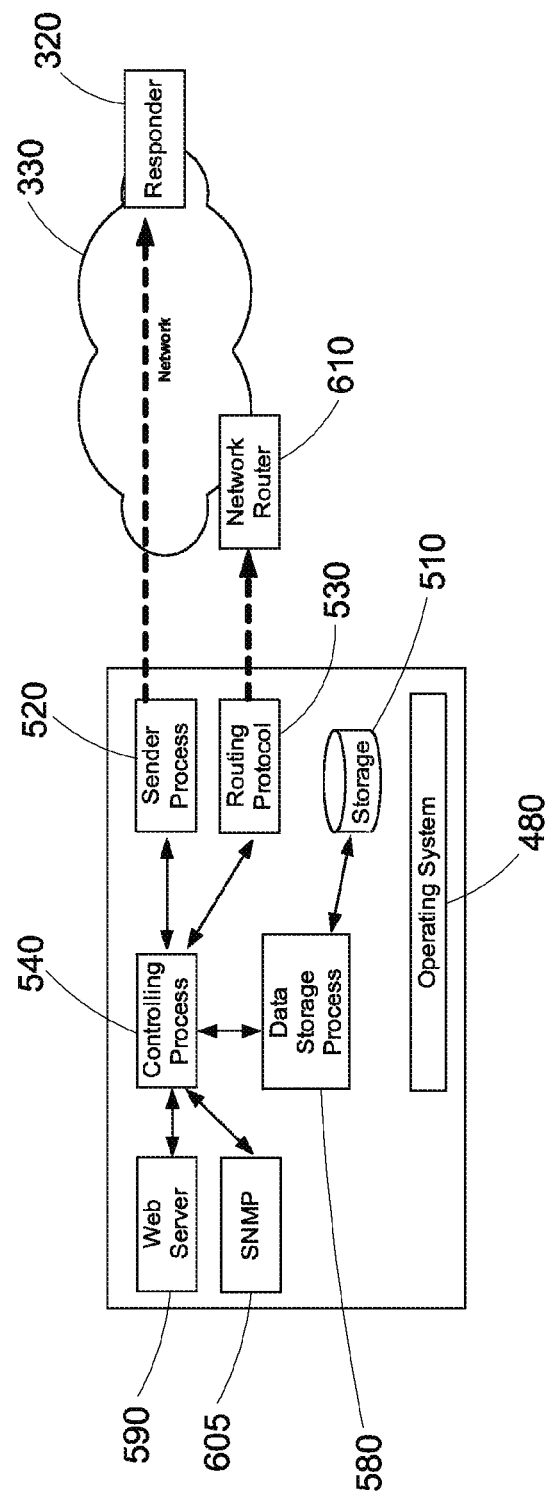
FIG. 12 is a schematic representation of an apparatus for determining a service interruption time measurement, according to a preferred embodiment of the present invention.

Preferably, referring now to FIG. 12, the operating system 480 of the apparatus 400 supports a number of processes associated to the above-described method. According to an embodiment of the present invention, a Sender Process 520 provides the means for sending. The means for sending preferably include establishing probe packets to target one or more Responder and then sending from the Sender the probe packets. A Routing Protocol Process 530 preferably provides the means for injecting. The means for injecting may include establishing protocol adjacencies and exchanging routes with one or more routers in the network. A Controlling Process 540 preferably manages the Sender Process 520 and the Routing Protocol Process 530, preferably by directing the Sender Process 520 to establish the probe packets and the Routing Protocol Process 530 to announce or withdraw routes via Network Router 610. Preferably, the Sender Process 520 provides the means for detecting and the means for determining the upper bound of said service interruption time measurement.

The Sender Process 520 preferably provides means for storing the sequence numbers and sending times of each of the probe packets sent by the Sender Process 520 and means for retrieving from the memory, the sending times $ts_n$ and $ts_{n-1}$. Preferably, the means for determining the lower bound of said service interruption time measurement is also provided by the Sender Process 520.

Preferably, the Controlling Process 540 further communicates with a Data Storage Process 580 for storing and retrieving data into and from the memory, for example a hard disk or any other long-term storage medium. For example, the Controlling Process 540 preferably conveys the upper and lower bounds and/or any other relevant data, from the Sender Process 520 to the memory for storage, via the Data Storage Process 580. Other processes, for example a web interface 590 or Simple Network Management Protocol (SNMP) 605, may be in communication with the Controlling Process 540 to retrieve measurement data, such as the upper bound, the lower bound, the granularity of the service interruption time measurement and/or the like, or to provision the system.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. An apparatus for determining a service interruption time measurement including routing protocol convergence time and Forwarding Information Base insertion time, between network devices A and B in a network having a routing protocol, said apparatus comprising:
   means for sending a plurality of probe packets from the device A to the device B, each probe packet comprising a source address corresponding to the device A;
   a clock;
   means for injecting, once the means for sending has commenced sending said plurality of probe packets, into the routing protocol, at a predetermined time $t_0$, established by said clock, a route $R_A$ to the source address of the probe packets originating from the device A;
   means for detecting, at the device A, by means of said clock, an arrival time ta, when a first of said probe packets has returned to the device A from the device B; and
   means for determining an upper bound of said service interruption time measurement, based on a time difference between the predetermined time $t_0$ and the arrival time ta.

2. An apparatus according to claim 1 further comprising:
   a memory;
   means for respectively associating to the probe packets sent by the means for sending, consecutive sequence numbers, and, by means of said clock, sending times ts;
   means for storing, for each of the probe packets, the corresponding sequence number and sending time, in the memory;
   means for identifying a sequence number n associated to the first of said probe packets that has returned;
   means for retrieving from the memory, a sending time $ts_{n-1}$ associated to a probe packet preceding said first of the probe packets; and
   means for determining a lower bound of said service interruption time measurement, based on a time difference between the predetermined time $t_0$ and the sending time $ts_{n-1}$, said lower bound being set to zero when the time difference between $t_0$ and $ts_{n-1}$ is negative.

3. An apparatus according to claim 2, further comprising:
   means for retrieving from the memory a sending time $ts_n$ associated to said first of said probe packets; and
   means for determining a granularity of the service interruption time measurement, based on a time difference between the sending times $ts_n$ and $ts_{n-1}$ added to a round-trip-time $rtt_n$, corresponding to a travel time of said first of the probe packet, from the device A to the device B and back to the device A.

4. An apparatus according to claim 1, wherein the clock has a frequency of at least 1 kHz.

5. An apparatus according to claim 1, further comprising:
   a central processing unit (CPU) operatively connected to the clock, the CPU comprising a software program for providing, via an operating system, the means for sending, the means for injecting, the means for detecting and the means for determining the upper bound;
   a random access memory (RAM) operatively connected to the CPU for executing the software program; and
   a network interface card, operatively connected to the CPU for providing communication with the network.

6. A method for determining a service interruption time measurement including routing protocol convergence time and Forwarding Information Base insertion time, between network devices A and B in a network having a routing protocol, said method comprising steps of:
   a. sending a plurality of probe packets from the device A to the device B, each probe packet comprising a source address corresponding to the device A;
   b. injecting, once the sending of step a has commenced, into the routing protocol, at a predetermined time $t_0$, established by a clock, a route $R_A$ to the source address of the probe packets originating from the device A;
   c. detecting at the device A, by means of said clock, an arrival time ta, when a first of said probe packets has returned to the device A from the device B; and
   d. determining an upper bound of said service interruption time measurement, based on a time difference between the predetermined time $t_0$ and the arrival time ta.

7. A method according to claim 6, further comprising, at step a, respectively associating to the probe packets, consecutive sequence numbers, and, by means of said clock, a sending time ts and storing, for each of the probe packets, the corresponding sequence number and sending time ts, in a memory, the method further comprising after step c, steps of:
   a. identifying a sequence number associated to the first of said probe packets that has returned at step c;
   b. retrieving from the memory, a sending time $ts_{n-1}$ associated to a probe packet preceding said first of the probe packets; and
   c. determining a lower bound of said service interruption time measurement, based on a time difference between the predetermined time $t_0$ and the sending time $ts_{n-1}$, said lower bound being set to zero when the time difference between $t_0$ and $ts_{n-1}$ is negative.

8. A method according to claim 7, further comprising steps of:
   a. retrieving from the memory a sending time $ts_n$ associated to said first of said probe packets; and
   b. determining a granularity of the service interruption time measurement, based on a time difference between the sending times $ts_n$ and $ts_{n-1}$ added to a round-trip-time $rtt_n$, said round-trip-time $rtt_n$ corresponding to a travel time of the said first of the probe packets, from the device A to the device B and back to the device A.

9. A method according to claim 7, wherein, in the step b, the clock has a frequency of at least 1 kHz.

* * * * *